United States Patent [19]

Kanesaka

[11] 4,426,985

[45] Jan. 24, 1984

[54] SUPERCHARGED INTERNAL COMBUSTION ENGINE

[75] Inventor: Hiroshi Kanesaka, Kawasaki, Japan

[73] Assignee: Kanesaka Technical Institute Ltd., Kanagawa, Japan

[21] Appl. No.: 305,722

[22] Filed: Sep. 25, 1981

[30] Foreign Application Priority Data

Sep. 26, 1980 [JP] Japan .................................. 55-132976
Sep. 26, 1980 [JP] Japan .................................. 55-132977

[51] Int. Cl.³ ...................... F02B 33/34; F02B 33/42; F02B 37/00
[52] U.S. Cl. ..................................... 123/564; 60/606; 60/611
[58] Field of Search .......................... 60/600, 601, 611; 123/564, 435

[56] References Cited

U.S. PATENT DOCUMENTS

| | | | |
|---|---|---|---|
| 1,653,877 | 12/1927 | Schaff | 123/435 |
| 2,989,840 | 6/1961 | Lieberherr | 60/611 |
| 4,322,948 | 4/1982 | Emmenthal et al. | 60/611 X |

Primary Examiner—Michael Koczo, Jr.
Attorney, Agent, or Firm—Finnegan, Henderson, Farabow, Garrett & Dunner

[57] ABSTRACT

A supercharged internal combustion engine is equipped with a supercharging device, a knock sensor and a rotary valve disposed upstream of an intake part of the engine. A Miller cycle is applied to the engine, and when an engine knock occurs, such a phenomenon is sensed by the knock sensor to be converted into an electric signal by which a control device for the rotary valve is operable to stop the charge feed to the engine for a short period of time prior to the completion of the control stroke of the engine, thereby extremely enhancing the output power of the engine while eliminating the generation of the engine knock.

6 Claims, 8 Drawing Figures

SUPERCHARGED INTERNAL COMBUSTION ENGINE

BACKGROUND OF THE INVENTION

The present invention relates to an Otto cycle engine. Particularly, it relates to a supercharged Otto cycle engine. It is well-known that a turbosupercharger which have been used for many years are capable of high-pressure-ratio supercharging.

In general, under a high pressure ratio, knocking is inherent in an Otto cycle gasoline engine since the compression temperature of the charge as well as the temperature at the compression end is high in spite of cooling by a charge cooler. Reducing the compression ratio to avoid knocking causes a decrease in thermal efficiency which leads to an increase in fuel consumption. Also, if the supercharged pressure is reduced in order to prevent the knocking, a big output power cannot be obtained. This, of course, does not attain the primary object of the supercharger. The above noted defects have caused a great difficulty in the development of supercharged Otto cycle engines.

SUMMARY OF THE INVENTION

Accordingly, an object of the present invention is to obtain a higher compression ratio and a high output power by cooling a charge to be sucked into a combustion chamber, while expanding the burned charge at a higher charge pressure.

Another object of the present invention is to control compression ratio by the application of a knock sensor as well as the Miller cycle to avoid knocking, thereby to eliminate the above noted defects and to ensure a high thermal efficiency.

DESCRIPTION OF THE PREFERRED EMBODIMENTS

Figure 1:
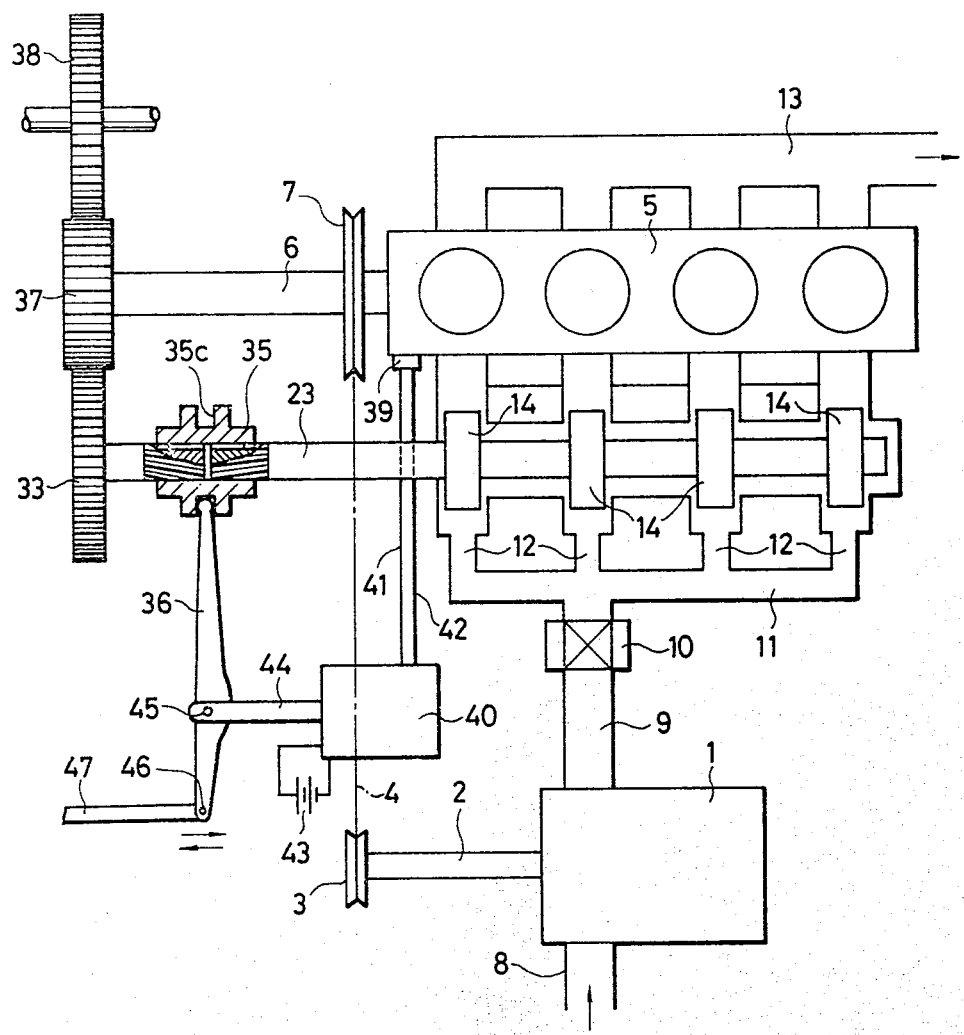
FIG. 1 is a schematical view of an engine system embodying the present invention.

The present invention will hereinafter be described in reference to the accompanying drawings. FIG. 1 shows a supercharged four cycle, Otto cycle engine with a displacement compressor which is well known per se. As shown in FIG. 1, the displacement compressor 1 is equipped with a driven shaft 2, to which a pulley 3 is fixed. An endless V-belt 4 is trained between the pulley 3 and the other pulley 7 fixed to the crankshaft 6 of the engine generally designated by reference numeral 5.

The pulley 7 drives the other pulley 3 through a continuous variable transmission mechanism (not shown). They are incorporated with the mechanism to drive the supercharger correspondingly at a low rotational ratio and a low output power, and in proportion to an output power increase required, while raising the rotational ratio, allowing the supercharger to increase the amount of air supplied to the intake ports of the engine 5. The air or air/fuel mixture sucked from an inlet port 8 is adiabatically compressed by the displacement compressor 1 while increasing its temperature and density. Thereafter, the air or air/fuel mixture is introduced through an inlet passage 9 into charge cooler 10 and is cooled close to but somewhat higher than the atmospheric temperature before it is delivered into the respective cylinders of the engine 5 through an inlet manifold 11 and respective branched passages 12.

The exhaust gas from the engine is discharged through an exhaust manifold 13 to the atmosphere. A rotary valve 14 is interposed to control the air or fuel-air mixture supplied from each inlet branched passage 12 to the engine 5.

Figure 2:
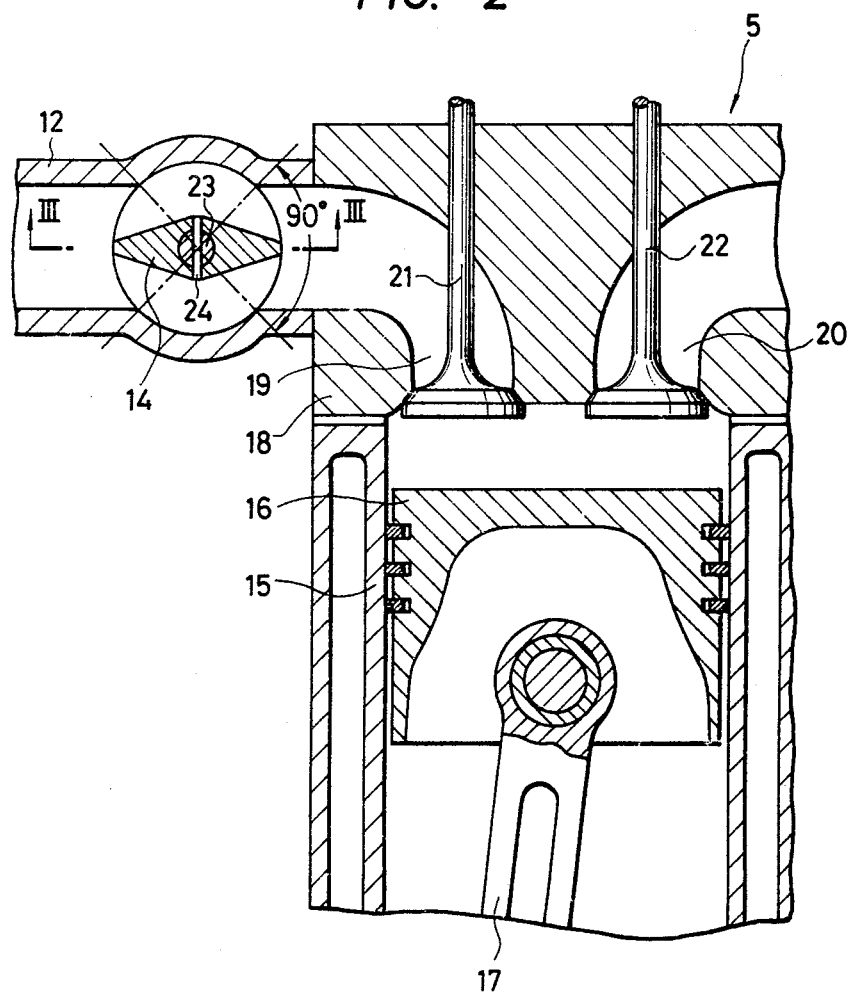
FIG. 2 is a schematical cross-sectional view of a primary part of the engine in which a rotary valve is provided according to the present invention.
Figure 3:
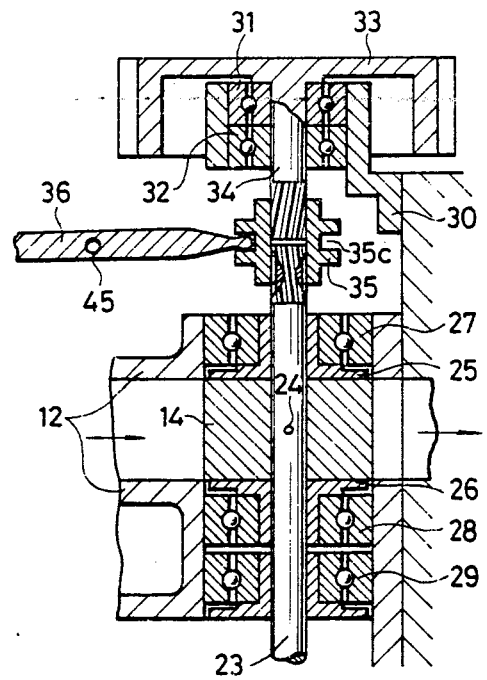
FIG. 3 is a cross-sectional view of an adjustment mechanism for the valve opening and closing timing of the rotary valve.

The details of its construction and the adjustment mechanism of valve timing are to be explained hereinafter in reference to FIGS. 2-4. FIG. 2 shows a four cycle Otto cycle engine constructed according to the present invention in which a reciprocable piston 16, rotatably coupled to an end of a piston connecting rod 17, is disposed in a cylinder 15. The other end of the connecting rod 17 is connected to the crankshaft 6. Above the cylinder 15 is disposed a cylinder head 18 in which an intake or suction port 19 and and exhaust port 20 are formed and in which are positioned an intake valve 21 and an exhaust valve 22, respectively. In an intake passage connected with the intake port 19, a rotary valve 14 used as a control valve is driven through a gear transmission mechanism by the crankshaft of the engine 5.

As an example, a driving mechanism for the above-described rotary valve 14 will hereinafter be described with reference to FIG. 3. The rotary valve 14 is secured to a rotary shaft 23 by a pin 24 as shown in FIG. 3. Sleeves 25 and 26 secured to the rotary shaft 23 clamp the rotary valve 14. The rotary shaft 23 is rotatably supported by ball bearings 27, 28 and 29 arranged between the respective sleeves and walls of the intake passage 12. The rotary shaft 23 is coupled by an adjustment member 35, hereinafter described, to a drive shaft 34 driven by a timing gear 33 coupled in a power transmitting relationship through a gear 37 to the crankshaft 6 and rotatably supported on a frame body 30 by ball bearings 31 and 32. As shown in FIG. 2, the rotary valve 14 has opening and closing periods at intervals of approximately 90°. The rotary valve 14 is driven at half of the rotational speed of the crankshaft 6 through the above-described timing gear 33. The intake stroke period of the engine occurs for approximately 180° of the crank angle. Therefore, the rotary valve 14 has an approximately 180° valve opening period in terms of the crank angle of the crankshaft.

Construction of a mechanism for adjusting the opening and closing periods of the rotary valve 14 will hereinafter be described with reference to FIGS. 3 and 4. At respective opposed ends of the rotary shaft 23 and the drive shaft 34 are formed helical splines 23a and 34a, screw directions of which are opposite to each other. Projections 35a and 35b formed in the inner periphery of the adjustment member 35 are engaged with the helical splines 23a and 34a, respectively.

Figure 4:
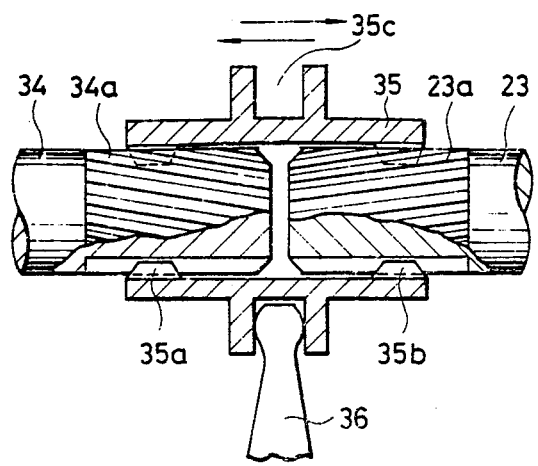
FIG. 4 is a cross-sectional view of a helical spline mechanism of the adjustment mechanism shown in FIG. 3.

For example, by moving the member 35 leftward of FIG. 4, the rotary shaft 23 is angularly disposed in the first direction relative to the drive shaft 34 and, similarly, for rightward movement of the member 35, the reverse angular movement of the rotary shaft 23 is obtained. Thus, by axial movements of the adjustment member 35, the rotational timing of the drive shaft may be varied to thereby control the opening and closing timing of the rotary valve 14.

The axial movements of the adjustment member 35 are carried out by the swing movements of an adjustment lever 36 which is engaged at one end with a retainer groove 35c formed in the periphery of the adjustment member 35. The lever 36 is pivotally supported at its intermediate position by the shaft 45 in FIG. 1 with the other end cooperating with a fuel supply rate controlling mechanism, specifically the accelerator pedal of the vehicle.

At the end of the crankshaft 6 is secured a crank gear 37 which drives a timing gear 38 operating a distributor, a cam shaft, a fuel injection pump and the like. The crank gear 37 simultaneously meshes with a drive gear 33 which operates the rotary valve, as described hereinafter in more detail, rotating the rotary valve at a half of the rotational speed of the crankshaft.

In each of the intake ports of the intake manifold is disposed a rotary valve 14 which is substantially the same as the rotary valve 14 shown in FIG. 2, namely, a two-blade valve with each blade secured to and operated by the rotary shaft 23. The valve opening and closing timing adjustment mechanism for the rotary valves 14 is substantially the same as shown in FIG. 4. More specifically, the rotary shaft 23 and the drive shaft 34, both rotated together with the drive gear 33, are aligned along a common axis and coupled to each other through an adjustment member 35. At the connecting ends thereof are formed helical splines 23a and 34a having oppositely directed screw threads with the helical splines engaged with projections 35a and 35b formed in inner peripheries of the adjustment member 35.

The adjustment of the output power of the engine and the suppression of knocking by the adjustment lever 36 is operated with the following construction. The adjustment lever 36, as shown in FIG. 1, is pivotally supported by a shaft 45 at the end of a rod 44. Provided an increase in output power is required, which is normally operated by a fuel supply rate controlling mechanisms, such as an accelerator pedal of the vehicle, a rod 47 pivotally connected with the lower end of the adjustment lever 36 by the shaft 46 is pulled leftward. As the lower end of the adjustment lever 36 is pulled leftward, it is turned clockwise centering on the shaft 45 thereby to push the adjustment member 35 engaged with at its upper end with the annular groove 35c rightward. Accordingly, the cut-off or the closing timing of the rotary valve 14 is delayed to thereby increase the output power of the engine 5. On the contrary, provided the lower end of the adjustment lever is pushed rightward, the output power is reduced. The knock sensor 39 is attached to the external wall of the engine 5. If engine knocks are generated, the sensor 39 senses the engine oscillation caused by knocking, producing signals through wires 41 and 42. An actuator 40 to which electric energy is supplied from a power source 43, is connectd to the sensor 39 through wires 41, 42. Accodingly, the adjustment lever 36 turns counterclockwise about the shaft 46, to push leftward the adjustment member 35 at the upper end of the adjustment lever 36 to thereby advance the cut-off timing of the rotary valves 14.

Figure 5:
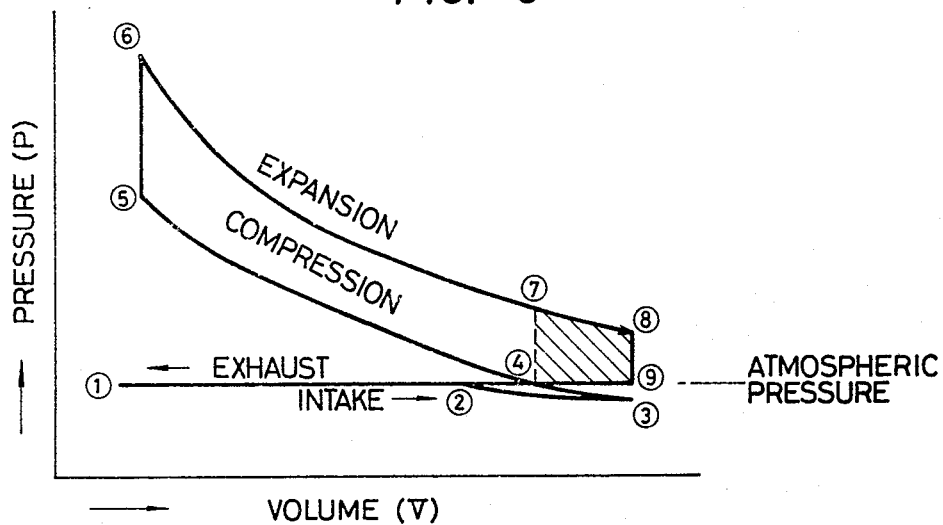
FIGS. 5 and 6 show P-V diagrams illustrating the operations of the engine according to the present invention.

The operation will be explained hereinafter. The P-V diagram at a half load is shown in FIG. 5. Accordingly to the present invention, the supercharger is constructed to lower the rotational ratio of the compressor shaft 2 to the crankshaft of the engine to thereby maintain the charge pressure as almost same as the atmospheric pressure. As shown in FIG. 5, the intake stroke starts at point (1) and is cut off at point (2) as the rotary valve is closed. The charge is adiabatically expanded from point (2) to point (3) where the intake stroke is completed, during which the pressure and the temperature of the charge are reduced.

The compression stroke is shown by the line (3)-(4)-(5). The adiabatical compression starts from the point (3) below the atmospheric pressure to raise the pressure and the temperature of the charge up to the point (4) where the charge is the same pressure and temperature as those of atmospheric air. The compression stroke further continues up to the final point (5). In a conventional engine, the compression stroke starts under atmospheric temperature and the compression ratio is designed to be fixed, for example, to eight times so that the compression temperature does not cause knocking. However, the compression ratio of the present invention is determined by the stroke shown by the line (4)-(5). An advanced cut-off of the rotary valve eventually realizes a reduction in the compression ratio and hence in the compression temperature of the engine.

Provided that the engine knocks at the compression ratio, for example, at 8.5 to 1 under the compression shown by the line (4)-(5), the knock sensor 39 shown in FIG. 1 senses the knocks an provides signals to the actuator 40 to thereby move the rod 44 leftward. Accordingly, the adjustment member 35 is pushed leftward to advance the cut-off timing of the rotary valves 14, which results in lowering the compression ratio, for example, 8 to 1 to prevent knocking.

Figure 6:
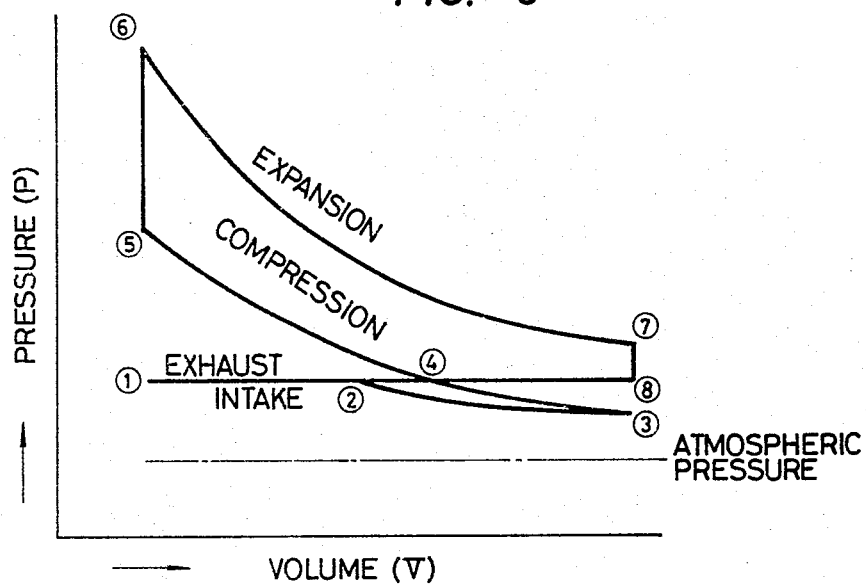

The present invention makes it possible to drive a supercharged or non-supercharged Otto cycle engine at the maximum compression ratio possible under a fixed expansion ratio by the application of a knock sensor, therefore to obtain a high output power as well as a low fuel consumption ratio. The expansion stroke is carried out as shown along the line (6)-(7)-(8)-(9). The P-V graph at the full load of a conventional engine follows the course shown along the line (4)-(5)-(6)-(7)-(4) and the output power is equal to the area surrounded by the line (4)-(5)-(6)-(7)-(4). Provided the expansion ratio of the engine is fixed at 10 and provided the engine is driven with a compression ratio of 8 to 1 according to the present invention, as the expansion stroke is increased by the line (7)-(8), the output power is also increased by the area obtained by the substracting the area surrounded by the lines (2)-(3)-(4)-(2) from the area surrounded by the lines (7)-(8)-(9)-(4)-(7), thereby to eventually improve the thermal efficiency. The engine to which the present invention is applied is constructed that at full load the displacement compressor 1 is driven at a high rotational ratio by the crankshaft 6 and that the charge pressure at a high pressure ratio is generated. Namely, the pulleys 3 and 7 are equipped with a continuous variable transmission mechanism (not shown herein) by which the rotational ratio of the compressor shaft 2 to the crankshaft 6 is changed accordingly to the required output power. If required output power is increased, the continuous variable transmission mechanism (not shown herein) is to enhance the rotational ratio of the displacement compressor 1 to the crankshaft 6. At a low output power, the charge pressure is maintained low and the power consumed by the displacement compressor is maintained small thereby to prevent the increase in the fuel consumption ratio at a partial load. At a high charge pressure in a conventional supercharged Otto cycle engine, knocking is inherent due to the high temperature at the beginning of the compression stroke, and reducing the compression ratio to suppress knocking causes a decrease in thermal efficiency, which leads to the increase in fuel consumption of the engine. The operation of the engine according to the present invention will hereinafter be described in reference to FIGS. 1 and 6. The air adiabatically compressed by the supercharger 1 or the air/fuel mixture is cooled by the charge cooler 10. The charge cooler is capable of cooling the charge to atmospheric temperature plus approximately 40° C. In a normal condition at an atmospheric temperature of 20° C., the charge temperature supplied into the cylinders 15 of the engine 5 is approximately 60° C. As shown in the FIG. 6, the intake stroke starts at the point (1) and at the point (2) the rotary valve 14 is cut off or closed. The charge is adiabatically expanded decreasing its temperature in the remaining portion of the intake stroke until point (3) where the intake stroke is finished. The compression stroke starts at point (3) adiabatically compressing the charge up to the same pressure before the adiabatical expansion at point (4) where the charge temperature in the cylinders is as almost same as at point (2). The charge in the cylinders is further adiabatically compressed up to point (5) where the compression stroke is finished. In this case the compression stroke shown by line (4)-(5) corresponds to the compression stroke of a conventional engine. Provided that the temperature of the charge at the beginning of the compression stroke at point (4) is approximately 60° C., in the present invention, as a high expansion ratio is fixed as described above, a high thermal efficiency is obtained in spite of the decrease in the compression ratio. The cut-off timing of the rotary valves 14 at point (2) is designed to adjust and select the maximum compression ratio possible under the operating condition of the engine 5 by the application of the knock sensor 39 and the actuator 40 in the same way as at the half load mentioned above. Under the operating condition shown in FIG. 6, if the engine knocks, the point (2) is shifted leftward by the knock sensor 39 and the actuator 40, thereby to lower the compression ratio.

Figure 7:
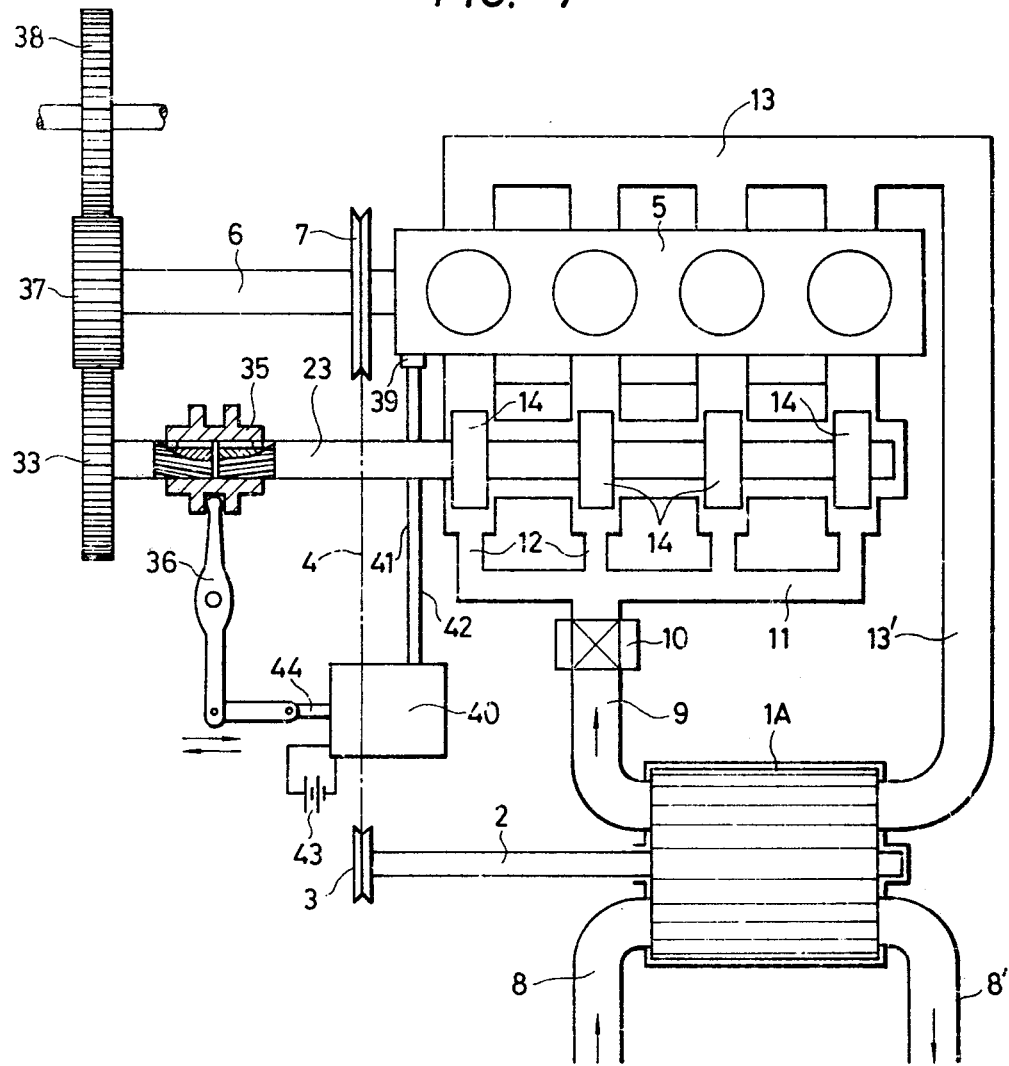
FIG. 7 is a schematical view of another embodiment of the invention.

FIG. 7 shows another embodiment according to the present invention wherein like members are designated by the same reference numerals used in the previous embodiment. In the embodiment shown in FIG.7, a comprex supercharger is used instead of the displacement compressor in order to obtain the same effect. In the comprex supercharger, which is different from the displacement compressor, the charge pressure is enhanced by the exhaust gas energy. A duct 13' of the comprex supercharger communicates with the Exhaust manifold as shown in FIG. 7. Also, a discharge duct 8' is opened to the atmosphere. The comprex supercharger is used as a supercharger for vehicle engines with a high efficiency at a low speed. The comprex supercharger 1A is driven to rotate by the crankshaft 6, but it is not supplied with any substantial power from the crankshaft. The thermal efficiency of the comprex supercharged engine is accordingly expected higher than that of the engine supercharged by the displacement compressor.

Figure 8:
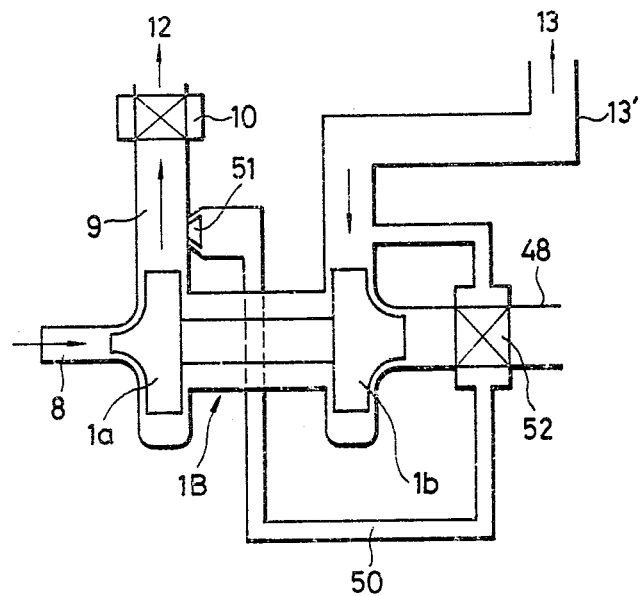
FIG. 8 is a schematical partial view of still another embodiment of the invention.

FIG. 8 shows still another embodiment of the present invention, in which a well-known turbocharger is used in order to attain the same object. In this embodiment, like members are designated by the same reference numerals used in the other embodiments. In FIG. 8, turbocharger 1B incorporates an exhaust turbine 1b driven by the exhaust gas energy and a compressor 1a driven by the exhaust turbine 1a, thereby to enhance the charge pressure. A bypass 50 is connected between the inlet passage 9 and the exhaust passage 13'. The exhausted gas entering duct 13' is delivered to the exhaust turbine 1b and to the exhaust manifold 13 (not shown in FIG. 8). The air inlet passage 9 is connected at one end to the compressor 1a of the turbocharger 1B and at its other end to the respective branched passages 12. In the turbocharged engine according to the present invention, if the cut-off ratio is suddenly changed, surging may occur in the compressor 1a. In order to avoid such surging the bypass 50 and a non-return valve 51 are provided as shown. A heat exchanger 52 is also disposed to enhance the thermal efficiency therein. The compressor 1a is driven by the exhaust gas energy and in spite of its rotation, however, it is not supplied with any power from the crankshaft. The thermal efficiency of the turbochaged engine is accordingly expected higher than that of the engine supercharged by the displacement compressor.

In the Otto cycle engine with the construction according to the present invention above described utilizing the knock sensor, the maximum compression ratio possible can be selected. In the supercharged Otto cycle engine, suppressing knocking by the knock sensor at a high charge pressure and at a high charge temperature to thereby select the maximum possible compression ratio, by which a high output power as well as a high thermal efficiency at a high expansion ratio may be attained while decreasing the fuel comsumption rate.

What is claimed is:

1. A supercharged internal combustion engine comprising a crankshaft, a piston, an associated cylinder, a combustion chamber defined by said piston and cylinder, a passage communicated with said combustion chamber, an intake port between said passage and said combustion chamber, an exhaust port in said combustion chamber, an intake valve periodically opening and closing said intake port, an exhaust valve periodically opening and closing said exhaust port, supercharging means for supplying air or an air/fuel mixture to said combustion chamber through said passage, rotary valve means disposed in said passage upstream of said intake port, said rotary valve means including a rotary valve operable to periodically open and close to control delivery of air or an air/fuel mixture to said combustion chamber, said rotary valve being open during approximately 180° of the crank angle of said crankshaft, control means for controlling the opening and closing timing of said rotary valve, actuating means for actuating said control means, and engine knock sensing means co-acting with said actuator means, whereby when engine knock is sensed by said engine knock sensing means, said actuating means operates to advance the cut-off timing of the rotary valve to stop the supply of air or air/fuel mixture to said combustion chamber for a predetermined period, starting prior to the completion of the intake stroke of said piston.

2. A supercharged internal combustion engine as claimed in claim 1, wherein said supercharging means includes a displacement compressor drivingly coupled to said crank shaft.

3. A supercharged internal combustion engine as claimed in claim 1, wherein said supercharging means includes a comprex type supercharger operatively coupled to said crank shaft.

4. A supercharged internal combustion engine as claimed in claim 1, wherein said supercharging means includes a turbocharger.

5. A supercharged internal combustion engine as claimed in claim 1, said engine knock sensing means being disposed on an external wall of the engine.

6. A supercharged internal combustion engine as claimed in claim 1, wherein said rotary valve means includes a two-blade rotary valve.

* * * * *